United States Patent [19]

Haims et al.

[11] 3,902,055

[45] Aug. 26, 1975

[54] BINARY ADDER CIRCUIT

[75] Inventors: Murray J. Haims, Yorktown Heights; Hsieh T. Hao, Montrose, both of N.Y.; Gerald Lebizay, Cagnes sur Mer, France; Alfred Weiss, Poughkeepsie, N.Y.

[73] Assignee: International Business Machines Corporation, Armonk, N.Y.

[22] Filed: Mar. 7, 1974

[21] Appl. No.: 449,133

[52] U.S. Cl. .......... 235/175

[51] Int. Cl.[2] .......... G06F 7/50

[58] Field of Search .......... 235/175, 176

[56] References Cited

UNITED STATES PATENTS

| | | | |
|---|---|---|---|
| 3,612,847 | 10/1971 | Jörgensen | 235/176 |
| 3,717,755 | 2/1973 | Brilcy | 235/175 |
| 3,728,532 | 4/1973 | Pryor | 235/175 |
| 3,766,371 | 10/1973 | Suzuki | 235/175 |
| 3,767,906 | 10/1973 | Pryor | 235/175 |

*Primary Examiner*—David H. Malzahn

*Attorney, Agent, or Firm*—Sughrue, Rothwell, Mion, Zinn and Macpeak

[57] ABSTRACT

An improvement in binary adder circuits based on a new Boolean algorithm is disclosed. The arrangement permits calculation of the carry from the logical combination of the addend, the EXCLUSIVE OR of the addend and the augend, and the carry of the next preceding stage. The circuit is readily implemented in NOR logic and has particular application in large scale integrated circuits (LSI).

3 Claims, 3 Drawing Figures

BINARY ADDER CIRCUIT

BACKGROUND OF THE INVENTION

1. Field of the Invention

The present invention generally relates to digital computer circuits, and, more particularly, to an improvement in binary adder circuits for use in the arithmetic section of a digital computer.

2. Description of the Prior Art

The conventional logic equations as set out, for example, in U.S. Pat. No. 3,454,751 to Brastins et al. for the results of binary addition are as follows:

$$S = (A \cdot \overline{B} + \overline{A} \cdot B) \cdot \overline{C}_{in} + (A \cdot B + \overline{A} \cdot \overline{B}) \cdot C_{in} \quad (1)$$

$$C = A \cdot B + (A \cdot \overline{B} + \overline{A} \cdot B) \cdot C_{in} \quad (2)$$

where S is the generated sum, C the generated carry, A is the augend, B is the addend and $C_{in}$ is the carry generated from the previous stage. The logical operation $A \cdot \overline{B} + \overline{A} \cdot B$ is the EXCLUSIVE OR function, and equations (1) and (2) can be simplified as follows:

$$S = (A \oplus B) . \overline{C}_{in} + (\overline{A \oplus B}) \cdot C_{in} \quad (3)$$

$$C = A . B + (A \oplus B) \cdot C_{in} \quad (4)$$

Equation (3) is itself EXCLUSIVE OR function. Thus, the sum may be generated with two EXCLUSIVE OR gates, the second gate requiring only the two quantities $A \oplus B$ and $C_{in}$. On the other hand, generation of the carry as set forth in equation (4) requires four quantities, i.e., A, B, $A \oplus B$, and $C_{in}$. It will be recognized that the latter two quantities are common to the generation of the sum.

As described in the Brastins et al. patent, these equations can be implemented in NAND or NOR logic. The same equations are implemented in U.S. Pat. No. 3,646,332 to Suzaki which discloses a binary added or subtractor employing EXCLUSIVE OR logic. Common to both arrangements, however, is the requirement for four quantities to generate the carry. This requirement is a complicating factor in the design of carry generating circuits.

SUMMARY OF THE INVENTION

It is, therefore, an object of the present invention to provide an improved binary adder circuit which eliminates one of the quantities required for carry generation in the prior art.

In accordance with the present invention, the foregoing and other objects are attained by providing an improved binary adder circuit based on a new Boolean algorithm. More specifically, the algorithm on which the invention is based is as follows:

$$A \cdot B = (\overline{A \oplus B}) \cdot B \quad (5)$$

By the use of this algorithm, equation (4) can be rewritten as follows:

$$C = (\overline{A \oplus B}) \cdot B + (A \oplus B) \cdot C_{in} \quad (6)$$

As set forth in equation (6), generation of the carry now requires only the three quantities B, $A \oplus B$ and $C_{in}$. Thus, the augend is no longer directly required for carry generation resulting in a general simplification of the hardware required in binary adder circuits.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
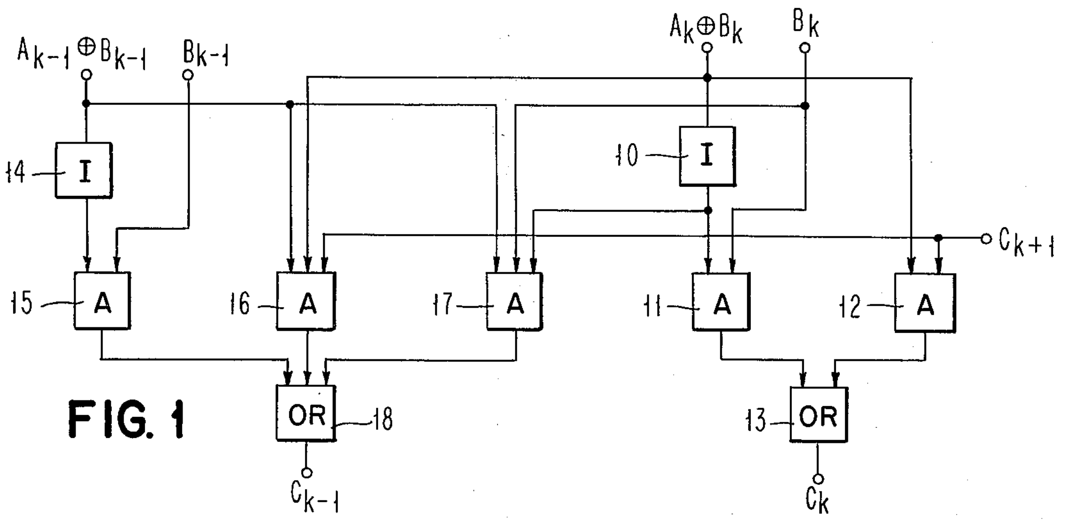
FIG. 1 is a logic diagram of a simultaneous two-carry generation circuit according to the teachings of the invention employing AND/OR/NOT logic.
Figure 2:
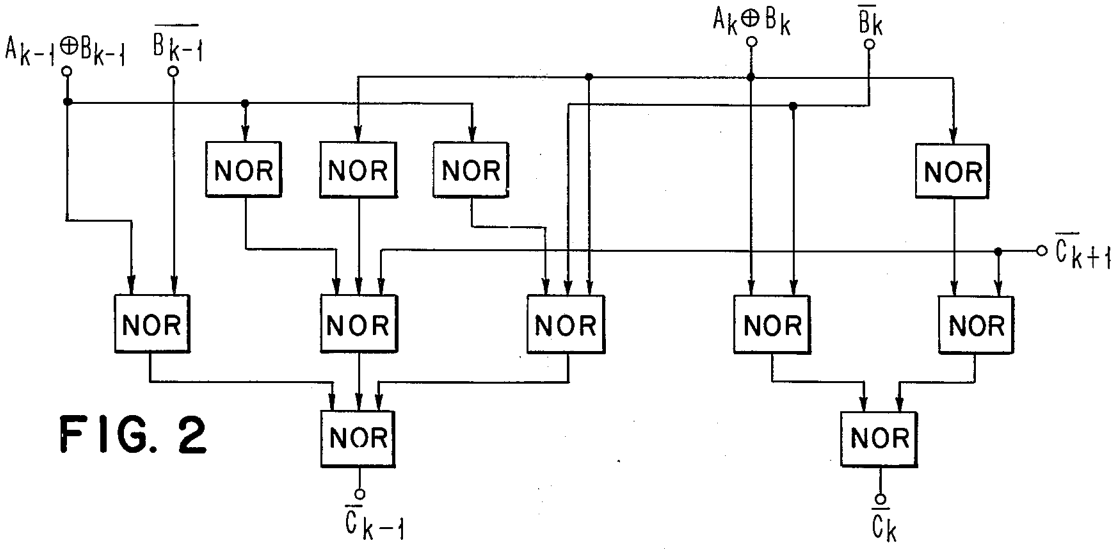
FIG. 2 is a logic diagram of the same circuit as shown in FIG. 1 but employing NOR logic.

In the notation of FIGS. 1 and 2, $k$–$l$ is a higher order than $k$, and $k$+1 is a lower order than $k$. Thus, in terms of equation (6), $C_{k+1}$ is the same as $C_{in}$, and $C_k$ is the same as C.

Referring now more particularly to FIG. 1, a carry generation circuit implementing equation (6) includes an inverter 10 which receives as its input the EXCLUSIVE OR function of the augend $A_k$ and the addend $B_k$. AND gate 11 receives as its inputs the output of inverter 10 and the addend $B_k$. The output of AND gate 11 is therefore $(\overline{A_k \oplus B_k}) \cdot B_k$. AND gate 12 receives as its inputs the EXCLUSIVE OR function of the augend $A_k$ and the addend $B_k$ and the lower order carry $C_{k+1}$. The output of AND gate 12 is then $(A_k \oplus B_k) \cdot C_{k+1}$. The outputs of AND gates 11 and 12 are combined by OR gate 13 to provide the output $c_k$.

As also shown in FIG. 1, simultaneous carry generation in the next higher order stage is possible using the invention. This may be accomplished by providing an inverter 14 and an AND gate 15 in the next higher order stage corresponding to the inverter 10 and AND gate 11. The output of AND gate 15 is $(\overline{A_{k-1} \oplus b_{k-1}}) . B_{k-1}$. An AND gate 16 receives as its inputs the EXCLUSIVE OR functions of the augend $A_{k-1}$ and the addend $B_{k-1}$, the EXCLUSIVE OR function of the augend $A_k$ and the addend $B_k$, and the carry $C_{k+1}$. The output of AND gate 16 is then $(A_{k-1} \oplus B_{k-1}) \cdot (A_k \oplus B_k) \cdot C_{k+1}$. Another AND gate 17 receives as its inputs the EXCLUSIVE OR function of the augend $A_{k-1}$ and the addend $B_{k-1}$, the addend $B_k$, and the output of inverter 10 to provide as its output $(A_{k-1} \oplus B_{k-1}) \cdot (\overline{A_k \oplus B_k}) \cdot B_k$. The outputs of AND gates 15, 16 and 17 are all combined in an OR gate 18 to provide the simultaneous generation of the carry $C_{k-1}$ as follows:

$$C_{k-1} = (\overline{A_{k-1} \oplus B_{k-1}}) \cdot B_{k-1} + (A_{k-1} \oplus B_{k-1}) \cdot (A_k \oplus B_k) \cdot C_{k+1} + (A_{k-1} \oplus B_{k-1}) \cdot (\overline{A_k \oplus B_k}) \cdot B_k \quad (7)$$

Equation (7) can be simplified as follows:

$$C_{k-1} = (\overline{A_{k-1} \oplus B_{k-1}}) \cdot B_{k-1} + (A_{k-1} \oplus B_{k-1}) \cdot [(\overline{A_k \oplus B_k} \cdot + (A_k \oplus B_k] \cdot C_k + 1] \quad (8)$$

However, the quantity within the brackets will be recognized as $C_k$ so that equation (8) can be further simplified as follows:

$$C_{k-1} = (\overline{A_{k-1} \oplus B_{k-1}}) \cdot B_{k-1} + (A_{k-1} \oplus B_{k-1}) \cdot C_k \quad (9)$$

,

From this it will be apparent that simultaneous carry generation for as many stages as may be desired can be accomplished using the present invention.

The invention is not limited to any particular logic and may be readily implemented in NOR logic as shown in FIG. 2. The implementation is straightforward and need not be described in detail except to note that the complements of the addends $B_{k-1}$ and $B_k$ and the carry $C_{k+1}$ are used. Otherwise, the logic circuit shown in FIG. 2 is the full functional equivalent of that shown in FIG. 1. The importance of the implementation in NOR logic is related to the use of LSI circuits which are most easily fabricated using NOR logic. Obviously, NAND logic could also be used in the practice of the invention.

Figure 3:
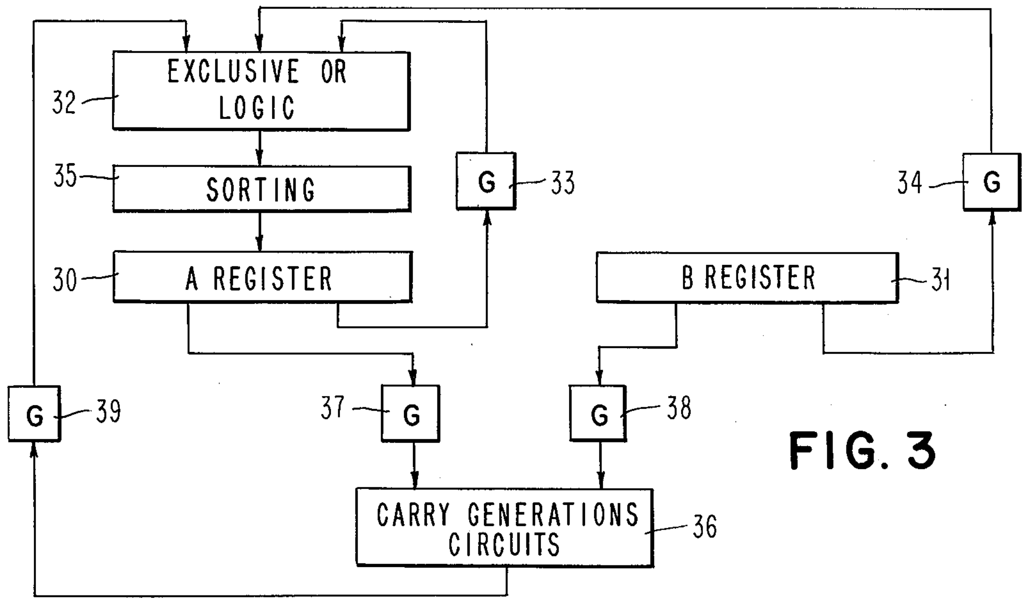
FIG. 3 is a system block diagram of the improved binary adder circuit employing the carry generation circuits of FIGS. 1 or 2 according to the invention.

A better appreciation of the invention may be had by reference to the system block diagram shown in FIG. 3. Two buffer registers 30 and 31 hold the two operands A and B, respectively. The first operation is to perform the EXCLUSIVE OR function A⊕B required for both sum and carry generation. This is done by directing the augend A to the logic 32 by means of gate 33 and the addend B to the logic 32 by means of gate 34 and then gating the output of the logic 32 into register 30 by gate 35. The logic 32 is conditioned to perform EXCLUSIVE OR function. The result of this operation will be to produce (A⊕B) in register 30.

The values (A⊕B) and B applied to the carry generation circuits 36 by means of gates 37 and 38, respectively, to produce carries. When this is done, the carriers are then directed to the logic 32 by gate 39, and the value (A⊕B) is directed to the logic 32 by gate 33. When gate 35 is enabled, the value (A⊕B)⊕CARRIES will be produced in register 30. This value is the sum of A and B.

It will be apparent that the embodiments shown are only exemplary and that various modifications can be made in construction and arrangement within the scope of the invention as defined in the appended claims.

We claim:

1. A binary adder comprising:

a. a first register for initially storing an augend, b. a second register for storing an addend, c. logic means having first, second and third inputs and an output for producing the EXCLUSIVE OR function of any two of said inputs at said output, d. a carry generation circuit including a plurality of stages for parallel operation, said carry generation circuit having first and second inputs and an output, each stage, except the first, comprising first AND gate means for combining the complement of said first input with said second input, second AND gate means for combining said first input with the carry generated by a preceding stage, and OR gate means for combining the outputs of said first and second AND gate means, and e. gating means for first connecting the outputs of said first and second registers to said first and second inputs, respectively, of said logic means and connecting said output of said logic means to said first register, for second connecting the outputs of said first and second registers to said first and second inputs, respectively, of said carry generation circuit, and for third connecting the output of said first register and said output of said carry generation circuit to said first and third inputs, respectively, of said logic means and connecting said output of said logic means to said first register, whereby the sum of said augend and addend is stored in said first register.

2. A method of adding binary numbers in digital computers or the like, comprising:

a. initially storing an augend in binary form in a first register, b. separately storing an addend in binary form in a second register, c. generating the EXCLUSIVE OR function of the contents of said first and second registers and storing the generated EXCLUSIVE OR function in said first register, d. then logically combining the contents of said first and second registers to generate carries, and e. generating the EXCLUSIVE OR function of said carries and the contents of said first register and storing the generated EXCLUSIVE OR function in said first register as the sum in binary form.

3. The method of adding binary numbers as recited in claim 2 wherein said step of logically combining includes:

a. generating the AND function of the contents of said second register with the compliment of the contents of said first register, b. generating the AND function of the contents of said first register, bit by bit, and a lower order carry for each bit of the contents of said first register, and c. generating the OR function of said two AND functions.

* * * * *

UNITED STATES PATENT AND TRADEMARK OFFICE

CERTIFICATE OF CORRECTION

PATENT NO. : 3,902,055

DATED : August 26, 1975

INVENTOR(S) : Murray J. Haims et al

It is certified that error appears in the above-identified patent and that said Letters Patent are hereby corrected as shown below:

IN THE SPECIFICATION:

Column 1, line 25 - after "itself" insert -- an --
line 36 - delete "added" and insert -- adder --

Column 2, line 14 - delete "k-l" (letter) and insert -- k-1 -- (numeral)
line 29 - delete "$c_k$" and insert -- $C_k$ --
line 35 - delete "$b_{k-1}$" and insert -- $B_{k-1}$ --
line 53 - delete "$A_{k-}1$" and insert -- $A_{k-1}$ --
line 53 - after "$B_k$" insert -- ) --
line 54 - after "$B_k$" delete "]" and insert -- ) --
line 54 - delete "$C_k+1$" and insert -- $C_{k+1}$ --

Column 3, line 18 - after "form" insert -- the --
line 20 - after "b" insert -- are --

Signed and Sealed this

*ninth* Day of *December 1975*

[SEAL]

*Attest:*

RUTH C. MASON
*Attesting Officer*

C. MARSHALL DANN
*Commissioner of Patents and Trademarks*